DATA TRANSMISSION SYSTEM AND DEVICES

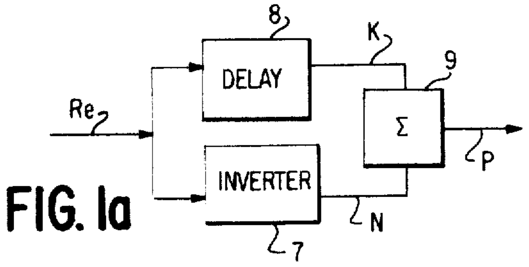
FIG. Ia
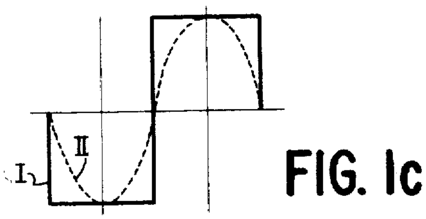
FIG. Ic
FIG. Ib
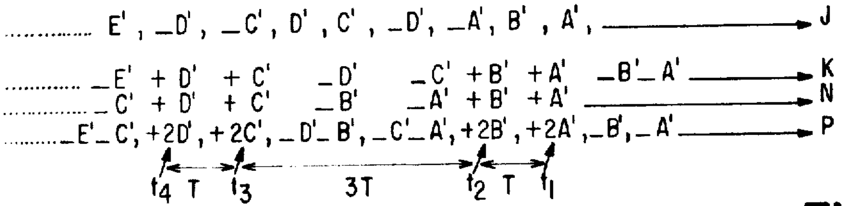
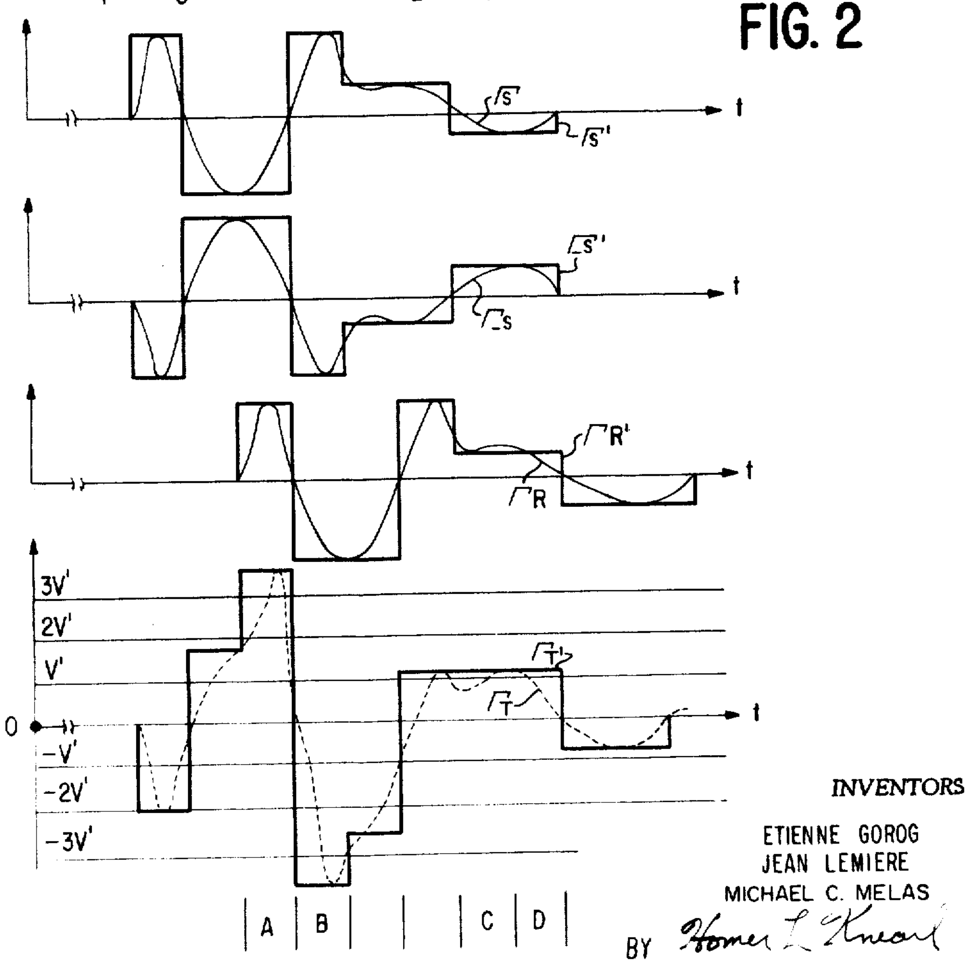
FIG. 2
INVENTORS
ETIENNE GOROG
JEAN LEMIERE
MICHAEL C. MELAS
BY Homer L. Knearl
AGENT July 30, 1968 E. GOROG ET AL 3,395,391

Filed Aug. 23, 1965 5 Sheets-Sheet 4

United States Patent Office 3,395,391

Patented July 30, 1968

3,395,391

DATA TRANSMISSION SYSTEM AND DEVICES

Etienne Gorog, Antibes, Jean Lemiere, Cagnes-sur-Mer, and Michael C. Melas, Cap d'Antibes, France, assignors to International Business Machines Corporation, Armonk, N.Y., a corporation of New York Filed Aug. 23, 1965, Ser. No. 481,628
Claims priority, application France, Feb. 26, 1965, 7,545
10 Claims. (Cl. 340—172.5)

ABSTRACT OF THE DISCLOSURE

An apparatus for deriving sampling pulses from a received signal for sampling information from the received signal, said received signal having a repetitive pattern of information slots.

This invention relates to a device for deriving sampling pulses from a received signal, the sampling pulses being used to sample information in the received signal.

In numerous transmission systems, original data recovery requires decoding of received signals. The method of carrying out the decoding depends on the coding used at the transmitter. The series of operations for carrying out the decoding have to take place during definite time intervals and be initiated at time instants defined with respect to the received signal arrival time. The time basis for monitoring these operations is sometimes generated locally at the receiver but generally is reconstituted from the received message. In the latter case, a clock signal is derived from the reception of a definite sequence sent over by the transmitter or from the reception of a signal which has repetitive characteristics serving as time marks.

When a clock signal is used to generate sampling pulses for the received signal, it is desirable to keep the clock signal synchronized with the received signal. If the received signal begins to drift, the derived clock signal must drift with it. Synchronism may be maintained by deriving the clock signal from a repetitive characteristic in the received signal. Then when the received signal drifts, the repetitive characteristic drifts also so that a clock signal derived from the characteristic will drift with the received signal. However, if noise appears in the signal similar to the repetitive characteristic, then the derived clock signal may be upset by the noise. Therefore, it is desirable to have a device which derives a clock signal from the repetitive characteristic of a received signal while said device remains relatively insensitive to noise in the received signal.

In addition if only portions of the received signal contain meaningful information, it is desirable to select from the derived clock signal those time intervals which correspond to the information portions of the received signal. In other words, having derived a clock signal it is desirable to further derive from the clock signal sampling pulses that coincide with information slots in the received signal.

It is an object of this invention to derive a clock signal from a received signal and maintain synchronism of the clock signal with the received signal while minimizing the clock signal's sensitivity to noise in the received signal.

It is another object of this invention to derive sampling pulses from a received signal whereby the sampling pulses are synchronized with the received signal to coincide with information slots in the received signal.

It is another object of this invention to derive a clock signal and associated sampling pulses from the repetitive characteristic of a received signal and to maintain synchronism between the clock signal and the received signal while minimizing the clock signal's sensitivity to noise in the received signal.

It is another object of this invention to acquire synchronism between a clock signal and the repetitive characteristics of a received signal.

In accordance with this invention the above objects are accomplished by detecting when the received signal crosses information thresholds and by using some of these crossing instants to trigger a clock which generates a clock signal. From the clock signal, sampling pulses are derived which are used to sample information from the received signal and to gate indications of information threshold crossings to the clock. Only those crossings of the information threshold which occur inside the sampling pulses are gated to the clock to initiate the clock signal. Since the sampling pulses coincide with the information slots in the received signal, the clock is gated by information threshold crossings during information slots and is effectively locked in synchronism with the information slots. If the received signal drifts, the sampling pulses drift with it.

More specifically, the clock signal is derived from a received signal which has a repetitive characteristic. The repetitive characteristic of the received signal is based on a repetitive pattern of information slots in the received signal. The repetitive pattern has a cyclic period being an integral multiple of the period T. In operation the detection of information threshold crossings occurring during information slots is passed to a clock to generate the clock signal having a cyclic period T. Sampling pulses are derived from the clock signal in a manner so that they have the same repetitive pattern as the information slots in the received signal and coincide with the information slots. These sampling pulses are fed back to gate to the clock those detections which represent tnformation threshold crossings occurring during sampling pulses and therefore occurring during information slots. If the received signal drifts, the information threshold crossings drift and cause the clock signal to drift with the received signal. Therefore sampling pulses derived from the clock signal also drift with the received signal, and synchronism between the sampling pulses and the information slots of the received signal is maintained. Also, the clock's susceptibility to noise is minimized because the clock signal is derived only from crossings occurring during the information slots in the received signal where the signal to noise ratio is the most favorable.

In another aspect of the invention, acquiring means responsive to the received signal acquires synchronization between the clock and the information slots so that the clock is correctly started when the apparatus is turned on.

The great advantage of our invention is that a clock signal may be derived from the repetitive pattern of a received signal and thereby maintain synchronism with the received signal, while the susceptibility of the clock to noise in the received signal is minimized.

The foregoing and other objects, features, and advantages of the invention will be apparent from the following more particular description of preferred embodiments of the invention, as illustrated in the accompanying drawings.

In the drawings:

FIG. 1*a* shows a decoding device which generates the received signal with repetitive characteristics being used in the preferred embodiment of the invention.

FIG. 1*b* shows the pattern of information in the received signal as it is operated on by the decoding device in FIG. 1*a*.

FIG. 1*c* shows data elements which carry information in the received signal.

FIG. 2 shows the waveform of the received signal at various points in the decoding device in FIG. 1*a*.

Figure 4:
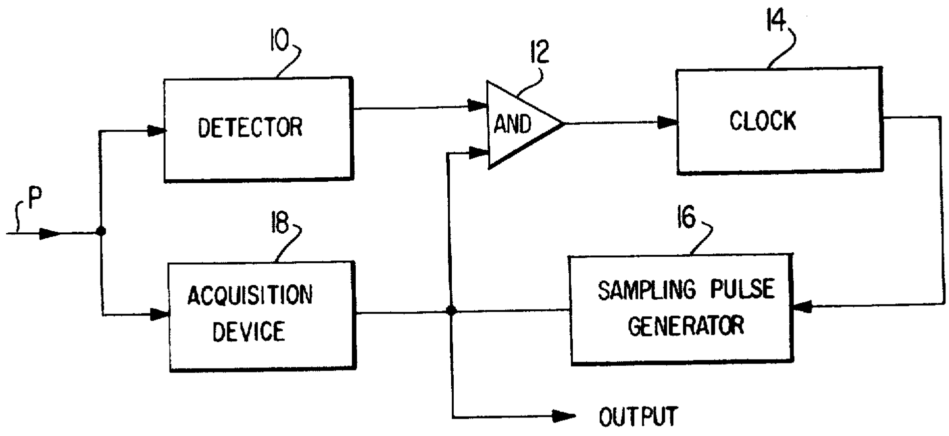
FIG. 4 shows generally the apparatus of the invention used for deriving a clock signal and sampling pulses from the received signal.
Figure 4A:
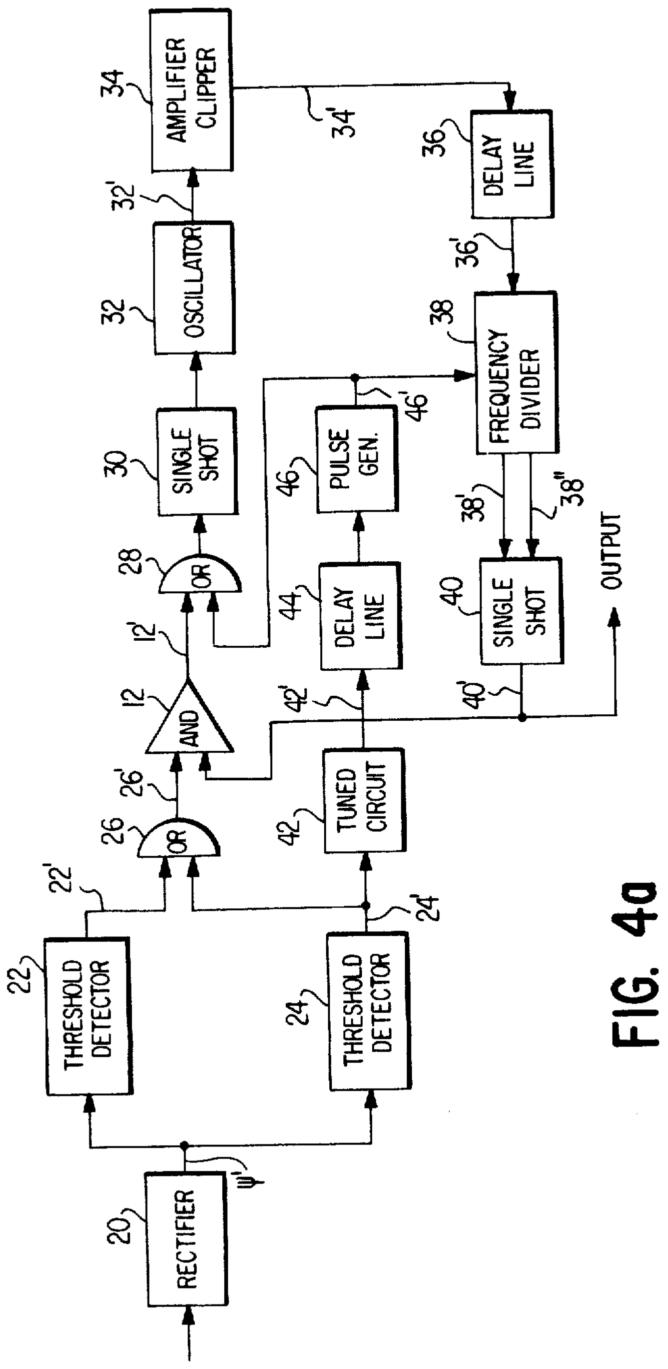
Figure 4B:
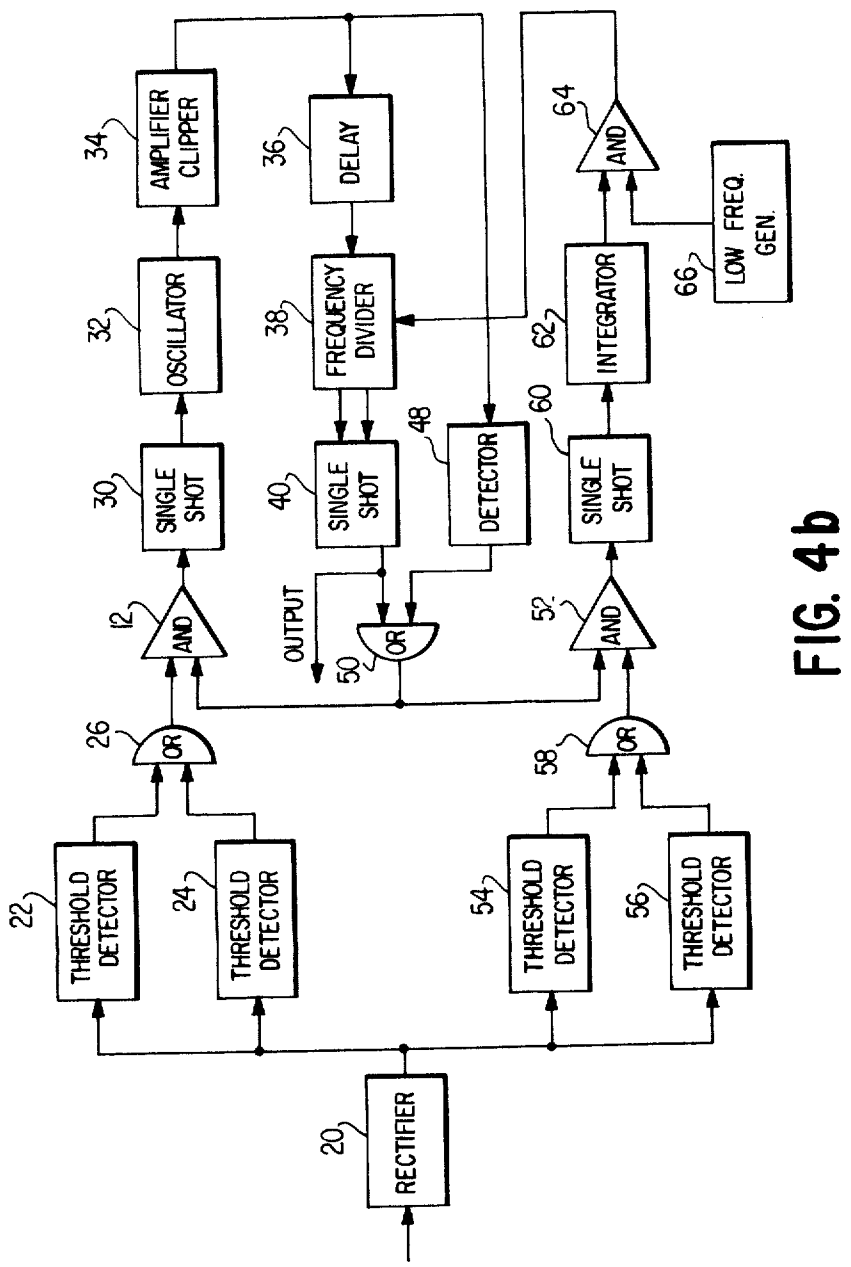

FIGS. 4*a* and 4*b* show the preferred embodiments of the invention.

Figure 5:
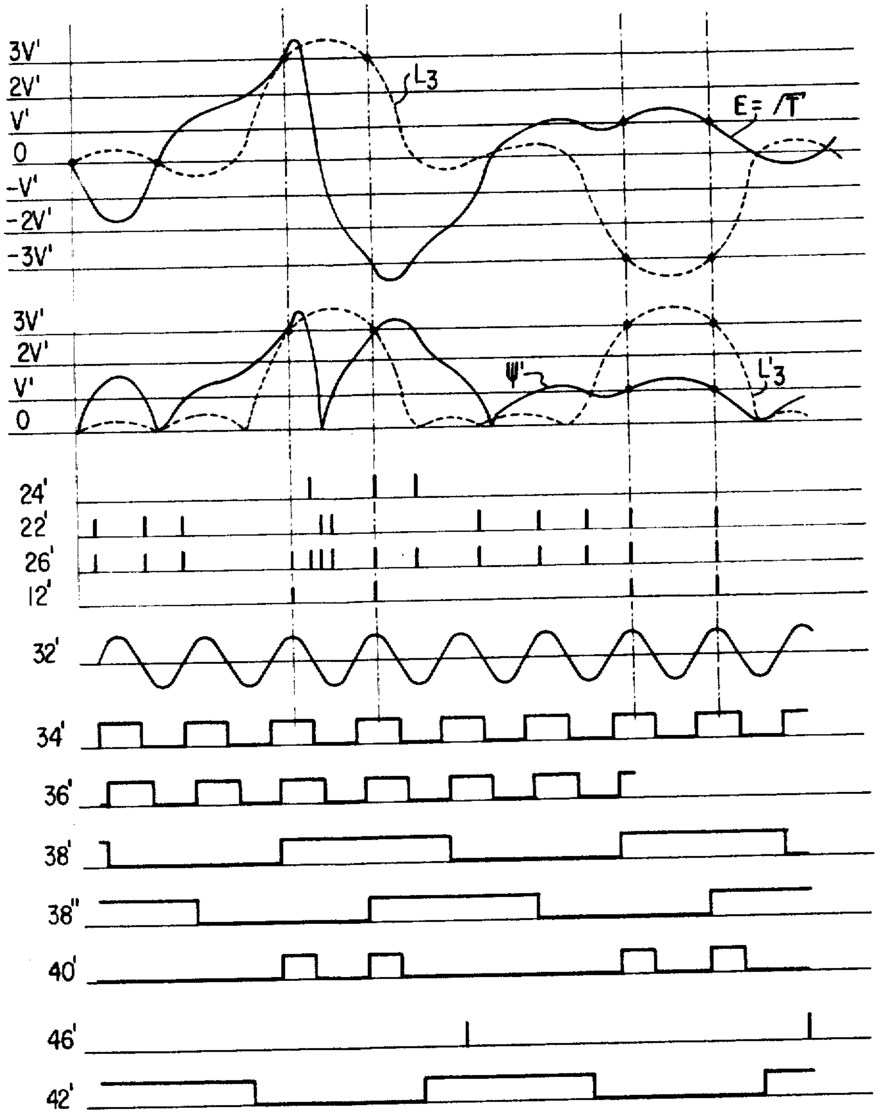

FIG. 5 shows the signal waveforms which occur at different points in the preferred embodiments.

The description of preferred embodiments, hereinafter, relates to clock recovery designed for received signal decoding where the signal is encoded in quaternary code as described in pending patent application Ser. No. 455,112 (series of 1960), assigned to the same assignee. The basic features of the encoding are now briefly reviewd:

At the transmitting end, the following data elements A, B, C, D, E, F are sent through according to the following scheme. A is first sent through, then B, then −A, then −B, then C, then D, −C, then −D, then E . . . .

Said elements can be of several distinct values. Any arbitrary element A, B . . . may take four distinct values +3V, +V, −V, −3V, the basic data having the following binary values:

0 represented by −V
1 represented by +V

Whenever four binary basic elements as $a$, $b$, $c$, $d$, are combined to form $A=2a+b$ and $B=2c+d$ two four level elements A, B, C, D, E . . . of such elements are transmitted according to the above mentioned scheme as: A, B, −A, −B, C, D, −C, −D, E . . . .

Such a sequence of elements has a frequency spectrum well suited for line transmission. For example, a signal A, B, −A, −B even transmitted under the I form (FIG. 1*c*) is received under the II form, whose waveform corresponds to the received frequency spectrum, and can be well identified. At the receiving end, a signal is received at R*e* (FIG. 1*a*) according to the orderly sequence shown in FIG. 1*b* on line J where the first appearing term is A′, then B′ corresponding to A, B. The transmission code is obviously redundant owing to the fact that A, −A is transmitted; the redundancy will normally be used at the time of identification of the elements A, B . . . E. Signal J (FIG. 1*b*) received at R*e* is passed on to an inverter 7 and to a delay device 8. The delay 8 delays the signal by a time duration of 2T where T is the time duration of an element A. Signal configuration and relative position of signals from inverter 7 and delay 8 are shown in lines K and N of FIG. 1*b*. Analog adder 9 combines these two signals and has as output P shown in line P of FIG. 1*b*: −A′, −B′, +2A′, +2B′ . . .

Obviously, inverter 7, delay 8 and adder 9 actually operate on the II type signal of FIG. 1*c*; the resulting waveform $\Gamma_T$ of FIG. 2 really corresponds to the resulting $\Gamma'_T$ which would be obtained if the original signal was entirely transmitted and transformed. FIG. 2 has been drawn for the case of a four element transmission of respective values:

$$A=+3V,\ B=-3V,\ C=+1V,\ D=+1V$$

$\Gamma_S$ is the signal received in this case through R*e* (FIG. 1*a*),
$\Gamma_S$ is the signal at N,
$\Gamma_R$ is the signal at K,
$\Gamma_T$ is the signal at P, and
waveforms Γ′ are theoretical signals.

From FIG. 1*b*, line P, it can be seen that elements A′, B′, C′, D′ whose amplitude is doubled will be collected at times $t_1$, $t_2$, $t_3$, $t_4$ from output P of adder 9. There will be a time interval of $d_0$ between $t_1$ and $t_2$, and between $t_3$ and $t_4$, $d_0$ being equal to data element duration T; but $t_2$ and $t_3$ will be separated by a time interval $d_m$ equal to 3T. Precise sampling of signal P at time instants $t_i$ will be imperative.

At each time $t_i$ or within the immediate vicinity of $t_i$, the received signal $\Gamma_T$ will always have a value ±V′ or ±3V′ nearly equal to ±KV or ±K3V, the elements having always the values ±V or ±3V at the sending end and the transmission as a whole having an amplification or damping factor of K. Furthermore, at said instants $t_i$, the received signal is always much different from 0 or ±2V′. At any other instants, different from $t_i$, crossing of level ±V′ will be much more random, and levels 0 or ±2V′ may be crossed over at these other instants while they are never crossed over at $t_i$.

Figure 3:
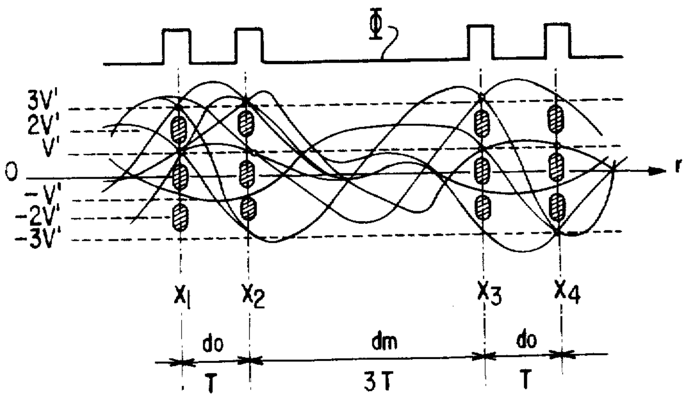
FIG. 3 is an "eye" diagram (explained hereinafter) showing the various paterns of received signals after they have passed through the decoding device in FIG. 1*a*.

This important remark will materialize itself on the screen of an oscilloscope; a representation of the oscilloscope pattern is shown in FIG. 3. Let a received message, being constituted at the sending end by a series of elements A, B, take values as +3V, +V, −V, −3V in a random fashion. The received signals will be displayed on the scope; the different waveforms representing a first part of the message, then a second part of equal duration, then a third part and so on. Because of luminescent persistency effect, numerous curves (of the type Γ of FIG. 2) corresponding each to a part of the message will be superimposed on the screen. Oscilloscope scanning may be adjusted so that the repetitive pattern of information slots at $t_1$, $t_2$, $t_3$, $t_4$ from several sections of the received signal are superimposed on each other.

The above mentioned remark, whereby levels ±3V′ or ±V′ are most often reached at times $t_i$, is translated on the screen into a maximum curve density at ordinates ±3V′ and ±V′ and for abcissa $x_j$ corresponding to $t_i$ where $j=1$ for $i=1, 5, 9$ . . .
$j=2$ *for* $i=2, 6, 10$ . . .
$j=3$ *for* $i=3, 7, 11$ . . .
$j=4$ *for* $i=4, 8, 12$ . . .

The lack of signal crossings at levels 0 or ±2V at times $t_i$ will show up on the screen by the fact that the curve distribution displaying a maximum curve density for points of abcissas $x_j$ at levels ±3V′ and ±V′ will show a curve free zone centered about levels 0 and ±2V′.

Owing to the oscillogram overall look the curve free zone has been referred to as an "eye." Information in a received signal may be detected by signal level reading at times $t_i$. Sampling pulses $\phi$ generated at times $t_i$ are shown in FIG. 3. Times $t_i$ represent the information slots of the received signal.

Referring now to FIG. 4, the invention will be generally described. The detector 10 detects when the received signal crosses information thresholds and generates a threshold pulse to indicate each such crossing. AND gate 12 passes some of these threshold pulses to clock 14. The clock in response to the threshold pulses is reset and initiated again by each received threshold pulse. The clock signal from clock 14 is passed to the sampling pulse generator 16. The sampling pulse generator generates sampling pulses which coincide with the information slots in the received signal. Gating means 12 is responsive to the sampling pulses to pass only those threshold pulses from detector 10 to clock 14 which coincide with the sampling pulses. In this way, clock 14 is reset only by threshold pulses representing information threshold crossings occurring during information slots. Therefore, the clock signal and sampling pulses are locked into synchronism with the information slots in the received signal.

In all cases, clock adjustment is based on the fact that the received signal structure, no matter the data contained therein, is such that the information slots, even though spaced irregularly, make up a definite repeated sequence. Preferably, any space between information slots is an integral multiple of a standard unit time interval T. The acquisition device 18, shown in FIG. 4 is used only when the apparatus is initially turned on and the clock has not yet synchronized with the received signal. The acquisition is used to bring the clock into synchronism with the threshold pulses occurring during information slots. The preferred embodiments in FIGS. 4*a* and 4*b* differ only in the type of acquisition device used.

Still referring to FIG. 4, the received signal will generally have a repetitive pattern of information slots-alternating with spaces, where the smallest space has a period T and the other spaces have periods being integral multiples of the period T. The clock 14 then in response to threshold pulses will generate a clock signal having a period T. As just pointed out the clock is reset and the clock signal initiated again by each threshold pulse received by the clock. The sampling pulse generator in this general case generates a repetitive pattern of sampling pulses-alternating with spaces where the smallest space has a period T and the other spaces have periods being integral multiples of the period T. This repetitive pattern of sampling pulses is identical to the repetitive pattern of information slots in the received signal. Also the sampling pulses are generated so as to coincide with the information slots in the received signal. Therefore when the sampling pulses are passed to AND gate 12 they will gate only those information threshold pulses from detector 10 to clock 14 which occur during information slots. Thus the clock is reset only by threshold pulses from information slots and is effectively locked in synchronism with the information slots of the received signal.

Now referring to FIG. 4*a*, there is shown a more detailed block diagram of one of the preferred embodiments of the invention. Rectifier 20 acts to full-wave rectify the received signal so that negative levels in the signal now become positive levels. Threshold detector 22 is responsive to the full-wave-rectified, received signal and generates an output pulse when that signal crosses the 1V′ threshold. Threshold detector 24 is also responsive to the rectified received signal, and it generates an output pulse when that signal crosses the 3V′ threshold. The threshold pulses from detectors 22 and 24 are collected by OR gate 26 and passed to AND gate 12. Threshold pulses passed by AND gate 12 proceed on through OR gate 28 to the single shot 30. The clock previously discussed in FIG. 4 is made up in FIG. 4*a* of single shot 30, oscillator 32 and amplifier-clipper 34. Single shot 30 acts to shape the pulses received from AND gate 12. The reshaped pulses pass from the single shot 30 to the oscillator 32 and trigger the oscillator into oscillation. these oscillations are slightly damped so that eventually, if other threshold pulses are not received, the oscillations from oscillator 32 will die out. Upon receipt of each new threshold pulse the oscillator is reset and initiated again. Amplifier-clipper 34 acts to form a square wave from the sinusoidal oscillations from oscillator 32.

From the amplifier-clipper 34 the square wave passes to delay line 36. The delay is variable so that the sampling pulses to be generated from the delayed square wave may be centered in the information slots of the received signal. From the delay line 36 the square wave passes to the frequency divider 38. The frequency divider divides the square waves by 4 so that a square wave output from the frequency divider has a period 4T. Note that there are two output lines from the frequency divider. One of the outputs is delayed relative to the other output by the period T. The square waves from the frequency divider are passed to a single shot 40. The single shot acts to generate an output pulse when it is triggered by the rising slope of an input waveform. Thus, single shot 40 acts to generate sampling pulses which are spaced alternately a period 1T apart and a period 3T apart. These sampling pulses coincide with the information slots in the received signals and have been centered in the slots by the delay line 36. The sampling pulses are fed back to AND gate 12 and used to gate information threshold pulses from detectors 22 and 24 to single shot 30.

Now referring to FIG. 4*a* and FIG. 5 the operation of this preferred embodiment will be described. In this description the primed reference numerals represent signals shown in FIG. 5. Waveform $\Gamma_T$ (FIG. 5) is received by rectifier 20 and full-wave rectified to achieve waveform $\psi'$. From this waveform threshold detector 24 generates threshold pulses 24′ (FIG. 5) indicating each crossing of the 3V′ threshold. Similarly, threshold detector 22 generates pulses 22′ (FIG. 5) to indicate each time the waveform $\psi'$ crosses the V′ threshold. Threshold pulses 22′ and 24′ are combined by OR gate 26 to form threshold pulses 26′. Sampling pulses 40′ act on AND gate 12 to select from the threshold pulses 26′ only those pulses 12′ which occur during sampling pulses and, therefore, during information slots. Threshold pulses 12′ then act through single shot 30 to trigger oscillator 32 into generating the sinusoidal waveform 32′. The sinusoidal waveform 32′ is amplified and clipped by amplifier-clipper 34 to form the square wave 34′. Square wave 34′ is then passed through delay line 36 and appears delayed as square wave 36′. Frequency divider 38 then acts to divide the square wave 36′ by 4 to generate square waves 38′ and 38″ which have periods of 4T. In addition waveform 38″ is delayed by a period T with respect to waveform 38′. This delay is accomplished by taking the output 38″ from a different trigger than the trigger used to generate output 38′. Single shot 40 then responds to the rising edge of each of the square waves 38′ and 38″ to generate sampling pulses 40′. The sampling pulses are separated alternately by a period T and a period 3T. Delay line 36 is variable so that these sampling pulses may be centered in the information slots of the received signal. Sampling pulses 40′ then act as previously pointed out to select only those threshold pulses which occur during information slots.

Still referring to FIG. 4*a* the clock initiation and acquisition of synchronism with the information slots is considered. The clock can acquire synchronism either from a normal data pattern or from a special repeated sequence which precedes data. In FIG. 4*a*, the clock acquires synchronism from a special repeated sequence. The sequence may be chosen so as to have the received signal cross level ±3V′ only at times $t_1$ where the sampling signals are to take place. The sequence composed of $A=+3V$, $B=+3V$, $C=D=-3V$ and expressed by the emission of A, B, —A, —B, C, D then takes the following values:

| | | | | | | | |
|---|---|---|---|---|---|---|---|
| +3V<br>A | +3V<br>B | −3V<br>−A | −3V<br>−B | −3V<br>C | −3V<br>D | +3V<br>−C | +3V . . .<br>−D |

This repeated sequence will be expressed at the output P of adder 9 (FIG. 1*a*) by a signal corresponding to:

| | | | | | | | | | | | |
|---|---|---|---|---|---|---|---|---|---|---|---|
| . . 0 | 0 | 3V′<br>2A′ | 3V′<br>2B′ | 0<br>−C′−A′ | 0<br>−D′−B′ | −3V′<br>2C′ | −3V′<br>2D′ | 0<br>−E′−C′<br>=−A′−C′ | 0<br>−F′−D′<br>=−B′−D′ | 3V′<br>2E′=2A′ | 3V′<br>2F′=2B′ |

Said signal will cross levels ±3V′ only at times corresponding to 2A, 2B, 2C, 2D shown as curve L3 in FIG. 5. The rectified signal L′3 (FIG. 5) from rectifier 20 is passed on to threshold detectors 22 and 24 feeding, as mentioned, OR circuit 26; threshold detector 24 also feeds tuned circuit 42. Tuned circuit 42 generates a square wave having a 4T period. To acquire synchronism between the clock and the information slots, tuned circuit 42 contains a clipping circuit to generate a square wave from its oscillations. The square wave 42′ (FIG. 5) is delayed by delay line 44 and its rising edge then excites trigger pulse generator 46. Trigger pulses 46′ (FIG. 5)

are spaced 4T apart and used, first, to initiate oscillator 32 via OR gate 28 and single shot 30 and, second, to set a count in frequency divider 38. Frequency divider 38 is simply a counter. The trigger pulse presets the frequency divider 38 to a given count such that when the divider 38 begins to reecive the initial clock signal its output waveforms 38' and 38'' will generate sampling pulses coinciding with the information slots of the received signal. Thus the clock has acquired synchronism with the information slots of the received signal and will stay locked in as previously described.

In FIG. 4*b*, the clock acquires synchronism from a normal data pattern with some loss of data until synchronism is acquired. This acquisition is based, first, on the fact that inside the information slots only the information thresholds are crossed by the received signal, while intermediate thresholds, which are centered in the "eyes," are not crossed. Second, the acquisition is based on the fact that outside the information slots, both the information thresholds and the intermediate thresholds are crossed by the received signal.

The embodiment in FIG. 4*b* differs from that in FIG. 4*a* only in the apparatus to acquire synchronism. Referring to FIG. 4*b*, the acquisition operation proceeds as follows. Clock signal detector 48 generates an output only if it does not detect a clock signal from amplifier-clipper 34. As long as clock signal detector 48 does not sense a clock signal, its output maintains, through OR gate 50, both AND gate 50 and the AND gate 12 enabled. Any threshold pulse from OR gate 26 can then pass through AND gate 12 to excite single shot 30 and oscillator 32. Oscillator 32 responding to all the randomly occuring threshold pulses will be initiated but will drift. When clock signal detector 48 detects the clock signal and turns off, AND gates 12 and 52 will only be gated by sampling pulses from single shot 40. These sampling pulses initiated in a random manner with respect to the signal will occur at times different from $t_1$ where threshold crossings get scarce. Oscillator 32 keeps on drifting and thereby causing the sampling pulses to drift. As soon as a sampling pulse occurs at an information slot $t_1$, the system stabilizes itself on this $t_1$ position which can still be wrong by being shifted by one period T. When there is stabilization on the wrong $t_1$ position, not all the sampling pulses will coincide with the information slots.

In order to correct a stabilization on the wrong $t_1$ position, intermediate threshold detectors 54 and 56 sense intermediate threshold crossings at levels +2V' or 0. If some of the sampling pulses do not coincide with the information slots, these sampling pulses will gate through AND gate 52 intermediate threshold pulses representing intermediate threshold crossings at levels +2V' or 0. Single shot 60 reshapes these gated intermediate threshold pulses and passes them to integrator 62. Integrator 62 accumulates the reshaped pulses, and periodically, the sum is gated by AND gate 64 to frequency divider 38. Low frequency generator 66 controls the periodic gating of AND gate 64. If the sum gated by AND gate 64 to frequency divider 38 exceeds a correction threshold, the frequency divider shifts its output signals 38' and 38'' (FIG. 5) by one period T. The sampling pulses follow the shift in signals 38' and 38'' and are, therefore, shifted by one period T also. This shift in sampling pulses will cause the information slots and sampling pulses to coincide. Thus, the clock will have acquired synchronism with the information slots.

When the sampling pulses coincide with the information slots, no intermediate threshold pulses will be gated through AND gate 52 because there are no intermediate threshold crossings in the information slots. Integrator 62 is provided to accumulate pulses passed by AND gate 52 so that the sampling pulses will be shifted by an accumulation of intermediate threshold pulses rather than a single intermediate threshold pulse. The accumulation makes the shift correction more immune to noise since it is possible for noise to cause an intermediate threshold crossing even during an information slot.

While the invention has been particularly shown and described with reference to two preferred embodiments thereof, it will be understood by those skilled in the art that various changes in form and details may be made therein without departing from the spirit and scope of the invention.

What is claimed is:

1. Apparatus for deriving from a received signal sampling pulses to sample information from the received signal, the received signal having information slots alternately separated by a period T and a period 3T said apparatus comprising:

detecting means for detecting each time the received signal crosses an information threshold and for generating a threshold pulse for each crossing whether the crossing occurs during an information slot or outside an information slot;

oscillating means responsive to threshold pulses for generating an oscillating signal having a period T, said oscillating means being reset and initiated again by each threshold pulse received by said oscillating means;

amplifying and clipping means responsive to said oscillating means for generating a clock signal of period T from the oscillating signal;

delaying means responsive to said amplifying and clipping means for delaying the clock signal so that the sampling pulses to be generated from the clock signal will be centered in the information slots;

frequency dividing means responsive to said delaying means for frequency dividing the delayed clock signal down to a first signal having a period 4T and a second signal also having a period 4T but being delayed a time T relative to the first signal;

pulse generating means responsive to the first and second signals from said frequency dividing means for generating sampling pulses alternately separated by a period T and a period 3T, each sampling pulse coinciding with an information slot in the received signal;

gating means responsive to said detecting means and said pulse generating means for gating from said detecting means to said oscillating means only the threshold pulse occurring during a sampling pulse so that, if the received signal drifts, the next threshold pulse gated to said oscillating means by the sampling pulse will reset said oscillating means and thus cause the clock signal and the sampling pulses to drift with the received signal whereby the sampling pulses stay in the information slots of the received signal.

2. Apparatus for deriving from a received signal sampling pulses to sample information from the received signal, the received signal having information slots alternately separated by a period T and a period 3T said apparatus comprising the apparatus of claim 1; and acquiring means responsive to the received signal for acquiring synchronism between said oscillating means and the threshold pulses occurring during information slots so that said oscillating means is continuously initiated by threshold pulses occurring during information slots and thus the sampling pulses lock onto the information slots of the received signal.

3. The apparatus of claim 2 wherein:

said acquiring means includes, square wave generating means responsive to said detecting means for generating a square wave having a period 4T and being initiated by threshold pulses occurring during information slots, and trigger pulse generating means responsive to said square wave generating means for generating a trigger pulse once every cycle of the square wave;

said oscillating means responsive to said trigger pulse generating means to initiate generation of the oscillating signal when said oscillating means receives the trigger pulse; and said frequency dividing means responsive to said trigger pulse generating means to be reset to a given count by the trigger pulse so that when the delayed clock signal, initiated at said oscillating means by the trigger pulse, is received, said frequency dividing means will generate the first and second signals at the proper time to cause said pulse generating means to generate sampling pulses coinciding with information slots in the received signal.

4. The apparatus of claim 2 wherein:

said acquiring means includes, clock signal detecting means responsive to the clock signal for detecting the presence or absence of the clock signal and for biasing said gating means to pass threshold pulses when the clock signal is absent so that any threshold pulse will initiate said oscillating means and thereby start the acquisition operation, intermediate threshold detecting means responsive to the received signal for detecting when the received signal crosses an intermediate threshold and for generating an intermediate threshold pulse for each crossing, accumulating means for counting the number of intermediate threshold pulses received by said accumulating means, and intermediate threshold gating means responsive to the sampling pulses for gating from said intermediate threshold detecting means to said accumulating means only the intermediate threshold pulses occurring during sampling pulses; and said frequency dividing means responsive to said accumulating means for shifting the first and second signal a full period T when the count in said accumulating means exceeds a correction threshold indicating the sampling pulses are not coinciding with the information slots.

5. Apparatus for deriving from a received signal sampling pulses to sample information from the received signal, the received signal having a repetitive pattern of information slots-alternating with spaces where the smallest space has a period T and the other spaces have periods being integral multiples of the period T, said apparatus comprising:

detecting means for detecting each time the received signal crosses an information threshold and for generating a threshold pulse for each crossing whether the crossing occurs during an information slot or during a space;

clocking means responsive to threshold pulses for generating a clock signal having a period T, the clocking means being reset and the clock signal being initiated again by each threshold pulse received by said clocking means;

sampling pulse generating means responsive to said clocking means for generating a repetitive pattern of sampling pulses alternating-with spaces where the smallest space has a period T and the other spaces have periods being integral multiples of the period T, each sampling pulse coinciding with an information slot in the received signal; and gating means responsive to said detecting means and said generating means for gating from said detecting means to said clocking means only the threshold pulse occurring during a sampling pulse so that, if the received signal drifts, the next threshold pulse gated to said clocking means by the sampling pulse will reset said clocking means and thus cause the sampling pulses to drift with the received signal and to stay in the information slots of the received signal.

6. Apparatus for deriving from a received signal sampling pulses to sample information from the received signal, the received signal having a repetitive pattern of information slots alternating with spaces where the smallest space has a period T and the other spaces have periods being integral multiples of the period T, said apparatus comprising the apparatus of claim 5; and acquiring means responsive to the received signal for acquiring synchronism between the clocking means and the threshold pulses occurring during information slots so that said clocking means is continuously initiated by threshold pulses occurring during information slots and thus the sampling pulses lock onto the information slots of the received signal.

7. The apparatus of claim 6 wherein:

said acquiring means includes, a repetitive signal generating means responsive to said detecting means for generating a repetitive signal having a period equal to the period of the repetitive pattern of the received signal, and trigger pulse generating means responsive to said repetitive signal generating means for generating a trigger pulse once every period of the repetitive signal;

said clocking means responsive to said trigger pulse generating means to initiate generation of the clock signal when said clocking means receives the trigger pulse; and said sampling pulse generating means responsive to said trigger pulse generating means to be reset by the trigger pulse so that, when the clock signal initiated by the trigger pulse is received, said sampling pulse generating means means generates the repetitive pattern of sampling pulses at the proper time for the sampling pulses to coincide with information slots in the received signal.

8. The apparatus of claim 6 wherein:

said acquiring means includes, clock signal detecting means responsive to the clock signal for detecting the presence or absence of the clock signal and for biasing said gating means to pass threshold pulses when the clock signal is absent so that any threshold pulse will initiate said clocking means and thereby start the acquisition operation, intermediate threshold detecting means responsive to the received signal for detecting when the received signal crosses an intermediate threshold and for generating an intermediate threshold pulse for each crossing, accumulating means for counting the number of intermediate threshold pulses received by said accumulating means, and intermediate threshold gating means responsive to the sampling pulses for gating from said intermediate threshold detecting means to said accumulating means only the intermediate threshold pulses occurring during sampling pulses; and said sampling pulse generating means responsive to said accumulating means for shifting the repetitive pattern of sampling pulses a full period T when the count in said accumulating means exceeds a correction threshold indicating the sampling pulses are not coinciding with the information slots.

9. Apparatus for deriving from a received signal a sampling pulse to sample information from the received signal, the received signal having distinct information slots, said apparatus comprising:

detecting means for detecting each time the received signal crosses an information threshold and for generating a threshold pulse for each crossing whether the crossing occurs during an information slot or outside an information slot;

clocking means for generating a clock signal in response to the threshold pulses received by said clocking means, the clock signal being reset and initiated again by each threshold pulse received by said clocking means;

sampling pulse generating means responsive to said clocking means for generating sampling pulses during the information slots of the received signal; and gating means responsive to said detecting means and said generating means for gating from said detecting means to said clocking means only the threshold pulse occurring during a sampling pulse so that, if the received signal drifts, the next threshold pulse gated to said clocking means by the sampling pulse will reset said clocking means and thus cause the sampling pulses to drift with the received signal and to stay in the information slots of the received signal.

10. Apparatus for deriving from a received signal sampling pulses to sample information from the received signal, the received signal having distinct information slots said apparatus comprising the apparatus of claim 9; and acquiring means responsive to the received signal for acquiring synchronism between said clocking means and the threshold pulses occurring during information slots so that said clocking means is initiated with threshold pulses occurring during information slots and thus the sampling pulses lock onto the information slots of the received signal.

References Cited

UNITED STATES PATENTS

| | | | |
|---|---|---|---|
| 3,080,487 | 3/1963 | Mellott et al. | 340—172.5 X |
| 3,247,491 | 4/1966 | Du Vall | 340—172.5 |
| 3,319,229 | 5/1967 | Fuhr et al. | 340—172.5 |
| 3,331,057 | 7/1967 | Hill | 340—172.5 |

ROBERT C. BAILEY, *Primary Examiner.*

P. R. WOODS, *Assistant Examiner.*